United States Patent
Singur et al.

(10) Patent No.: US 11,247,847 B2
(45) Date of Patent: Feb. 15, 2022

(54) DEVICE AND METHOD FOR FEEDING A CONTAINER GROUP TO A CLOCKED PROCESSING MACHINE

(71) Applicant: KHS GmbH, Dortmund (DE)

(72) Inventors: Igor Singur, Bad Kreuznach (DE); Thomas Niehr, Bad Münster Am Stein Ebernburg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/966,587

(22) PCT Filed: Jan. 22, 2019

(86) PCT No.: PCT/EP2019/051462
§ 371 (c)(1),
(2) Date: Jul. 31, 2020

(87) PCT Pub. No.: WO2019/158321
PCT Pub. Date: Aug. 22, 2019

(65) Prior Publication Data
US 2020/0361716 A1  Nov. 19, 2020

(30) Foreign Application Priority Data
Feb. 16, 2018 (DE) .......................... 102018103533.0

(51) Int. Cl.
*B65G 47/08* (2006.01)
*B65G 47/71* (2006.01)
*B65G 47/86* (2006.01)

(52) U.S. Cl.
CPC ........... *B65G 47/084* (2013.01); *B65G 47/71* (2013.01); *B65G 47/847* (2013.01); *B65G 2201/0247* (2013.01)

(58) Field of Classification Search
CPC .. B65G 47/084; B65G 47/71; B65G 47/8471; B65G 47/847; B65G 2201/0247
(Continued)

(56) References Cited
U.S. PATENT DOCUMENTS 4,742,667 A    5/1988  Muller et al.
6,520,316 B2 *  2/2003  De Guglielmo ........ B65B 21/06
                                                          198/419.2
(Continued)

FOREIGN PATENT DOCUMENTS

DE          3141364 A1    5/1983
DE     102005032322 A1    1/2007
(Continued)

*Primary Examiner* — Gene O Crawford
*Assistant Examiner* — Lester Rushin, III
(74) *Attorney, Agent, or Firm* — Occhiuti & Rohlicek LLP (57) ABSTRACT

An apparatus includes a linear feeding-unit having a first linear section and a transfer device that transfers containers, as a group, from the linear feeding-unit to a clocked processing-machine and an entry device having a main feeding-unit distribution-stars. The first distribution-star receives containers from the main feeding-unit at a first transfer-region and transfers and the second distribution-star receives containers from the main feeding-unit at a second transfer-region. A periphery of the first distribution-star comprises a receiving section that receives containers from the main feeding-unit and an empty section interrupts receiving of the containers. The empty section is devoid of supporting-and-retaining elements. However, the receiving section comprises as many supporting-and-retaining elements as there are containers in the container group.

19 Claims, 4 Drawing Sheets

(58) Field of Classification Search
USPC .......... 198/427, 430, 431, 441, 459.2, 478.1
See application file for complete search history.

(56) References Cited

U.S. PATENT DOCUMENTS

| | | | |
|---|---|---|---|
| 6,945,013 | B2 | 9/2005 | Taggart |
| 10,968,048 | B2 * | 4/2021 | Niehr .................. B65G 47/907 |

FOREIGN PATENT DOCUMENTS

| | | | | |
|---|---|---|---|---|
| DE | 102007016159 | A1 | | 10/2008 |
| DE | 102011007935 | A1 | | 7/2012 |
| DE | 102013106742 | A1 * | 12/2014 | ............. B65B 27/04 |
| DE | 102013106742 | A1 | | 12/2014 |
| DE | 102013219847 | A1 | | 4/2015 |
| JP | 2015020858 | A * | 2/2015 | |
| JP | 2015020858 | A | | 2/2015 |
| WO | 2016052104 | A1 | | 4/2016 |
| WO | WO-2016052104 | A1 * | 4/2016 | ............. B41F 17/22 |

* cited by examiner

DEVICE AND METHOD FOR FEEDING A CONTAINER GROUP TO A CLOCKED PROCESSING MACHINE

RELATED APPLICATIONS

This is the national stage of PCT application PCT/EP2019/051462, filed on Jan. 22, 2019, which claims the benefit of the Feb. 16, 2018 priority date of German application DE 102018103533.0, the contents of which are herein incorporated by reference.

FIELD OF INVENTION

The invention relates to a device and an associated method for removing containers in groups from a continuous container-flow and for feeding a container group to a clocked processing-machine.

BACKGROUND

In the beverage industry, it is often the case that one must feed containers into a container-processing machine. In some cases, the containers are fed continuously. However in other cases, it is necessary to feed the containers in groups. A container-processing machine that accepts containers in groups is sometimes called a "clocked" container-processing machine.

When feeding a clocked container-processing machine, it is necessary to transfer a set of containers all at once.

A difficulty arises because containers do not generally come in groups. They arrive continuously, one container after another. Thus, there must be a way to transform this continuous stream of containers into groups.

SUMMARY

The present invention provides an apparatus and method for feeding containers in groups to a clocked processing-machine, which, with a particularly simple structure, allows for the removal of containers in groups from a continuous container-flow formed from individual containers that are being transported in a suspended manner and that simultaneously allows for the feeding of the containers in groups to the clocked processing-machine. The present invention provides a device for the removal of containers in groups from a continuous container-flow and for feeding a container group with a predetermined number of containers to a clocked processing-machine.

A container group is a set of containers that are intended to be fed simultaneously into a processing machine and/or to be transported as a group to the same processing station of the processing machine, and/or to be processed simultaneously or essentially simultaneously at a processing station. Examples of a processing station include but are not limited to: a spraying station, a drying station, a filling station, and/or a closing station. A container group has two or more containers. Some container groups have six or more containers.

In one aspect, the apparatus comprises an entry device, a linear feeding-unit with a first linear-section, and a transfer device. The entry device comprises a main feeding-unit and first and second distribution-stars. The main feeding-unit has supporting-and-retaining elements for the hanging transport of the containers in the form of a continuous container-flow. It is disposed to define first and second transfer regions for the transfer of containers from the container flow to the first distribution-star and second distribution-star respectively. The first distribution-star is designed to take the containers that are removed from the container flow from the main feeding-unit in the first transfer region and to transfer them to the first linear-section of the linear feeding-unit.

For taking up the containers in groups out of the continuous container-flow, the first distribution-star comprises, along its periphery, a receiving section with a number of support-and-retaining elements. The number of supporting-and-retaining elements of the receiving section corresponds to the specified number of containers of a container group, i.e. the number of supporting-and-retaining elements of the at least one receiving section is matched to the number of containers of a container group.

This receiving section adjoins an unoccupied empty section. The empty section thus interrupts receipt of containers.

The supporting-and-retaining elements arranged directly behind one another along the periphery therefore form a group of supporting-and-retaining elements. In the present case it is to be understood by this, in particular, that the first distribution-star is provided with supporting-and-retaining elements only over a part of its periphery, i.e. only over an angle that subtends less than the full $2\pi$ radians available, which in turn are arranged in a grouped manner, namely as one group. The unoccupied or free empty section is to be understood as being a section of the periphery in which no supporting-and-retaining elements are arranged, i.e. which is not configured to receive containers from the main feeding-unit in the first transfer region.

In some embodiments, the supporting-and-retaining elements of the first distribution-star are secured to a star plate in such a way that they project over a periphery of the star plate and essentially protrude outwards over the periphery of the star plate preferably in the radial direction or protrude on the periphery side from the star plate outwards.

As the first distribution-star rotates, the receiving section and the empty section take turns passing through the first transfer region, which is at a point of tangency between the main feeding-unit and the first distribution-star. A transfer of containers from the main feeding-unit to the first distribution-star or a removal of containers from the container flow by the first distribution-star can only take place as the receiving section passes through the first transfer region, namely if, in the first transfer region, supporting-and-retaining elements of the first distribution-star are available for receiving containers.

During the interval during which the empty section of the first distribution-star runs through the first transfer-section, the containers that happen to also be running through the first transfer-section are bypassed and brought instead to the second transfer-region where they are transferred to the second distribution-star.

Due to the grouped arrangement of the supporting-and-retaining elements and due to the corresponding predetermined number of supporting-and-retaining elements in such a group, it is possible for a container group with a predetermined number of containers, namely a container group with a predetermined group size, to be removed from the container flow and to be transferred to the first linear-section of the linear feeding-unit.

The handover of each container takes place individually. In doing so, it also extracts a group from the container flow. As a result, the number of containers of the container group is already retained at the removal from the container flow at the first transfer region. This number depends on the number of supporting-and-retaining elements in the receiving section of the first distribution-star.

The number of containers of the container group corresponds to the number of containers that can be transferred by the transfer device from the linear feeding-unit into the processing machine and that are processed in a clocked or pulsed period in the processing machine. This means that the number of containers of the container group, and therefore the number of supporting-and-retaining elements in a group of supporting-and-retaining elements arranged in the receiving section, namely in a supporting-and-retaining element group, is adjusted to the number of transfer places or receiving places of the transfer device, and to the number of processing places or receiving places in the processing machine, preferably identical to them.

The apparatus thus provides a particularly simple way to remove a particular number of containers from a container flow to form a group. The procedure is essentially automatic, as it depends only on the rotational movements of individual units of the entry device. It does not require any control or regulation of supporting-and-retaining elements. There is no movement of the supporting-and-retaining elements, either radially or circumferentially. Instead, the supporting-and-retaining elements remain at fixed positions relative to the star plate.

In some embodiments, the number of supporting-and-retaining elements of the main feeding-unit is an integer multiple of the number of supporting-and-retaining elements within the receiving section of the first distribution-star.

In some embodiments, the second distribution-star, which is arranged downstream of the first transfer-region, receives all the containers that the main feeding-unit brings to the second transfer-region and transports them onwards. This empties the main feeding-unit after one full rotation or after a complete circuit, thus reducing the risk of both containers passing into a counter-flow and of a container being involved in a collision.

In other embodiments, the linear feeding-unit comprises a second linear-section that is parallel to the first. In such embodiments, the second distribution-star transfers containers taken from the main feeding-unit in the second transfer-region to the second linear-section of the linear feeding-unit.

Yet other embodiments include those in which the second distribution-star is a pocket star and those in which it is a toothed star.

In some embodiments, the second distribution-star is configured like the first, namely with a receiving section and an empty section. In such embodiments, there are as many supporting-and-retaining elements in the second distribution-star's receiving section as there are containers of a container group.

Embodiments include those in which the main feeding-unit is an entry star and those in which it is an endlessly circulating transport segment.

In those embodiments in which it is an endlessly circulating transport segment, the segment is an entry oval, provided with two linear transport segment sections arranged essentially parallel to one another, and there are two deflection sections arranged opposite one another for connecting the linear transport segments.

Also among the embodiments are those in which the endlessly circulating transport segment is configured as a gripper chain and those in which it is configured as a transport rail with allocated carriage elements. Among these are embodiments in which an electromagnetic direct drive drives the endlessly circulating transport segment.

In some embodiments, the dividing units are provided in the region of the linear sections. In these embodiments, the dividing units are arranged before or inside a transfer region between the linear feeding-unit and the transfer device. Among these are embodiments in which the dividing units are configured as dividing worms or as pocket chains.

Still other embodiments include those in which the first and/or second distribution-star has plural receiving sections, each of which has as many supporting-and-retaining elements as there are containers in the container group. Such embodiments feature an empty section is arranged between any two receiving sections.

Further embodiments include those in which the transfer device is configured is a clocked or pulsed transfer device that is arranged to transfer a container group from the linear feeding-unit into the clocked processing-machine.

Embodiments further include those that have a further feed device, upstream of the main feeding-unit. A suitable example of such a device is a feed star.

In another aspect, the invention features a method for removing containers in groups from a continuous container-flow and for feeding a container group to a clocked processing-machine.

A main feeding-unit transports the hanging containers in a continuous container-flow along an entry direction. A first distribution-star removes a predetermined number of containers to form a container group. The first distribution-star is downstream of the main feeding-unit. It transfers the containers to a first linear-section of a linear feeding-unit. The containers are then taken from the linear feeding-unit and transferred into a clocked processing-machine.

In a preferred practice, the containers are taken up in a first transfer-region in groups from the continuous container-flow by a receiving section that extends along the first distribution star's periphery. The receiving section includes a predetermined number of supporting-and-retaining elements. An empty section along the first distribution-star, which adjoining the receiving section, interrupts container removal from the main feeding-unit. The containers that remain on the main feeding-unit as a result of this interruption are then transferred to a second distribution-star, in a second transfer region that is downstream of the first transfer region.

The receiving section and empty section thus take turns passing through the first transfer-section. The first distribution-star takes containers as long as its receiving section is passing through the first transfer-section. It then stops taking containers while its empty section passes through the first transfer-section.

The containers, however, remain until a second transfer region is present at the main feeding-unit, and for as long as the empty section of the first distribution-star is running through the first transfer region. These containers are then transferred to the second distribution-star in the second transfer region.

Preferably, the containers taken up by the second distribution-star are transferred to a second linear-section of the linear feeding-unit. The transfer device then takes up the container groups. When it does so, it alternates between taking a container group from the first linear-section and taking a container group from the second linear-section.

The expression "essentially" or "approximately" signifies in the meaning of the invention deviations in each from the exact value by +/−10%, preferably by +/−5%, and/or deviations in the form of changes that are not of significance for the function.

Further embodiments, advantages, and possible applications of the invention are also derived from the following description of exemplary embodiments and from the Figures. In this situation, all the features described and/or figuratively represented are in principle, individually or in any desired combination, the object of the invention, irrespective of their arrangement in the claims or reference to them. The contents of the claims are also deemed to be a constituent part of the description.

BRIEF DESCRIPTION OF THE FIGURES

The invention is explained in greater detail hereinafter on the basis of the Figures in relation to exemplary embodiments. The Figures show.

Identical reference numbers are used in the figures for elements of the invention that are the same or have the same effect. Moreover, for easier overview, only reference numbers are represented in the individual figures that are required for the description of the respective figure.

DETAILED DESCRIPTION

Figure 1:
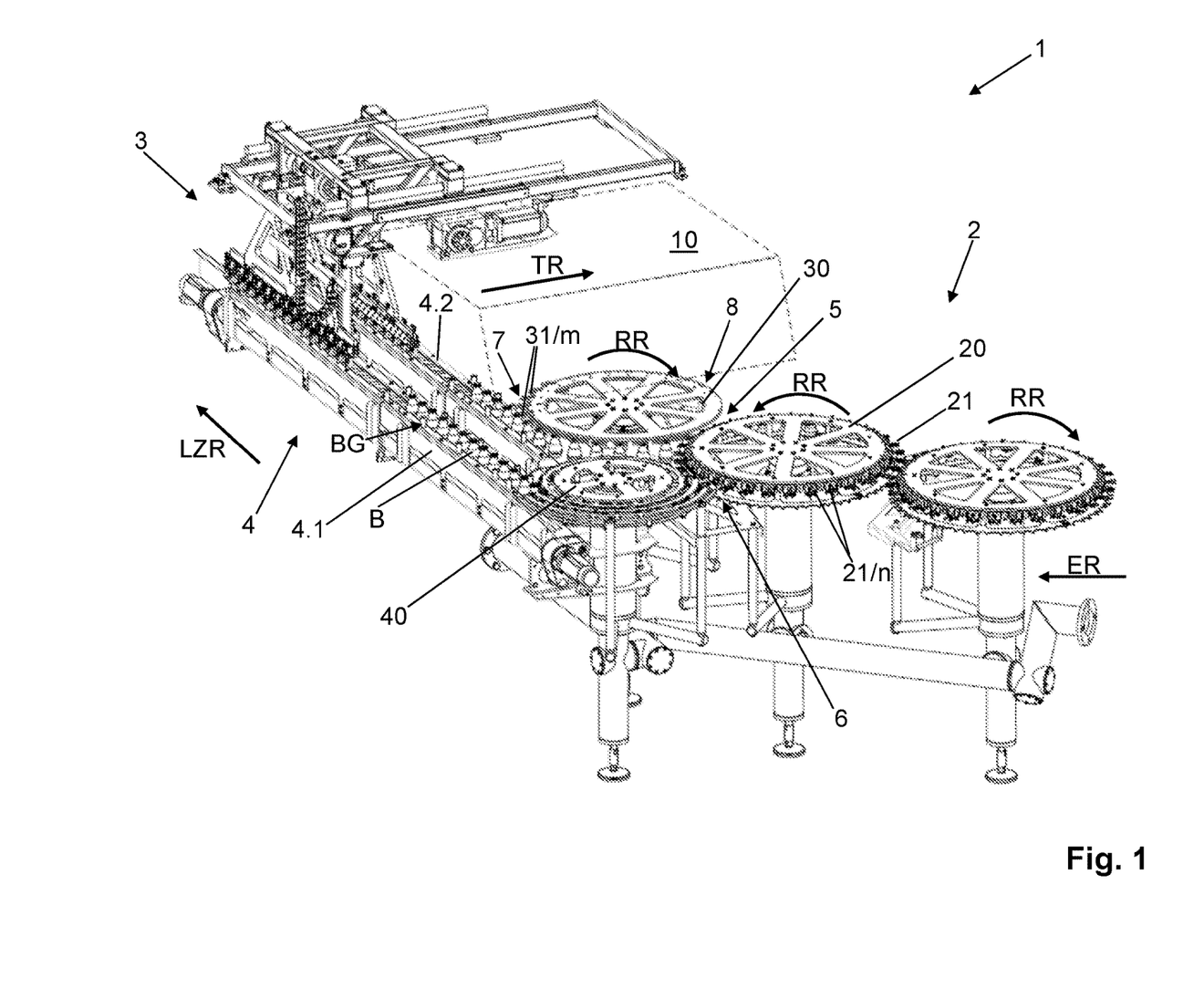
FIG. 1 shows an embodiments of the apparatus.
Figure 2:
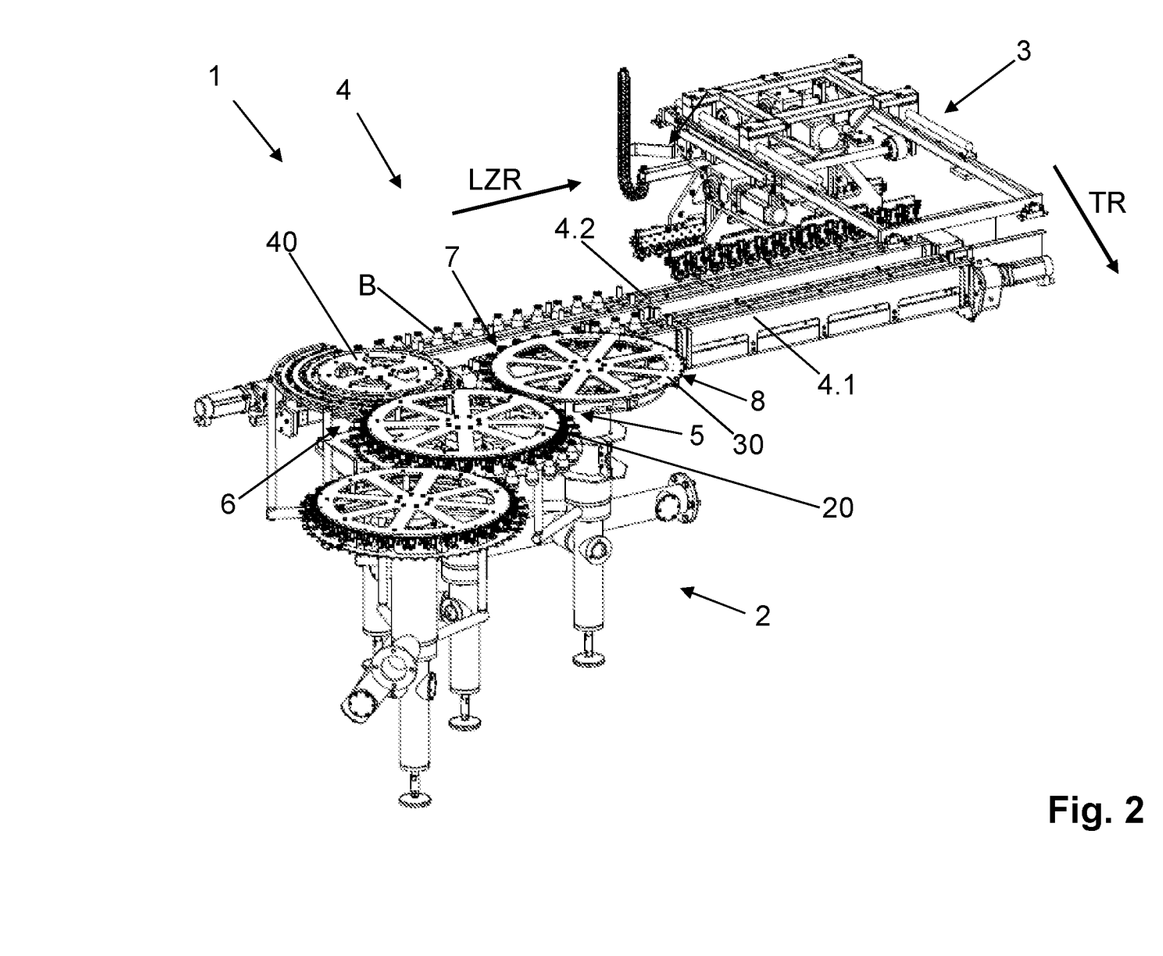
FIG. 2 shows a side view of the apparatus shown in FIG. 1.
Figure 3:
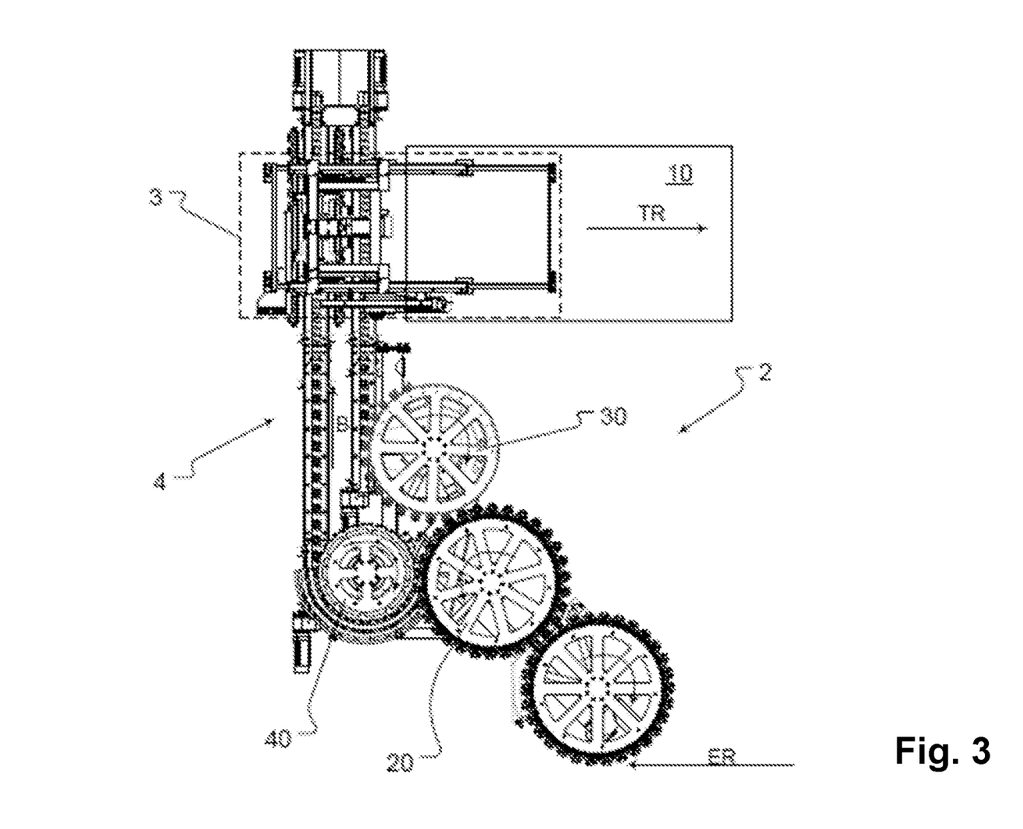
FIG. 3 is a view form above the apparatus shown in FIGS. 1 and 2.

FIGS. 1-3 shown an apparatus 1 that removes groups of containers B form a container flow and feeds container groups BG, each having a predetermined number of containers, to a clocked processing-machine 10. In the illustrated embodiment, the containers B are bottles, such as PET bottles.

The details of the clocked processing-machine 10 are not important and are therefore omitted. The apparatus 1 is either arranged upstream of the clocked processing-machine 10 or it is part of the clocked processing-machine 10.

In some embodiments, the clocked processing-machine 10 is a clocked filling-machine or filling system that fills containers B in groups. Among these are embodiments that carry out linear filling, in which containers B are arranged along a row with spaces between the containers B. Linear filling is a stepped operation in which container groups BG are fed into a filling machine.

A container group BG has a pre-determined number of containers B that are arranged relative to one another in such a way that the containers' longitudinal axes run parallel to one another and are spaced apart by the same interval. This pre-determined number defines the container-group's "group size." The group size matches the number of processing locations that are present in the clocked processing-machine 10.

Referring to FIGS. 1-3, the apparatus 1 comprises an entry device 2, a linear feeding-unit 4, and a transfer device 3.

The entry device 2 enables the containers B to run in an in an entry direction ER into the apparatus 1.

At first, the flow is continuous. However, the flow is eventually interrupted as container groups BG are separated out from the container flow and passed to the linear feeding-unit 4.

The linear feeding-unit 4 transports the containers B in a linear feeding direction LZR towards the transfer device 3. It is at the transfer device 3 that the containers B are passed into the clocked processing-machine 10. This passage occurs in a clocked or pulsed manner in a transfer direction TR that is transverse to the linear feeding direction LZR.

The entry device 2 comprises a main feeding-unit 20 as well as first and second distribution-stars 30, 40 that are downstream of the main feeding-unit 20. As can be seen from FIGS. 1 to 3, there exists another star upstream of the main feeding-unit 20 that transports containers in an entry direction ER towards the main feeding-unit 20. As used herein, the "downstream" direction is the direction in which the containers are transported.

The main feeding-unit 20, the first distribution-star 30, and the second distribution-star 40 all rotate in corresponding rotation directions RR that advance the container B downstream. Each of the main feeding-unit 20, first distribution-star 30, and second distribution-star 40 suspends containers B by hanging them from neck region or neck ring thereof.

The main feeding-unit 20 includes supporting-and-retaining elements 21 secured to a periphery thereof. Each supporting-and-retaining element 21 suspends a container B during transport thereof. The supporting-and-retaining elements 21 are uniformly distributed along the entry star's periphery. Each supporting-and-retaining element 21 is secured to a star plate such that the supporting-and-retaining element 21 projects laterally outward over a periphery of the star plate. In a typical embodiment, the supporting-and-retaining elements 21 are fixed to the main feeding-unit 20 so that their positions are invariant. Each supporting-and-retaining element 21 suspends a container B by its neck or by a neck ring.

A transfer of a container from the main feeding-unit 20 to the first star 30 occurs at a first transfer-region 5 at a point of tangency between the main feeding-unit 20 and the first star 30.

The first distribution-star 30 removes containers B in groups from the container flow. To carry this out, the first distribution-star 30 features a periphery having a receiving section 7 and an empty section 8 that adjoins the receiving section 7. The receiving section 7 has m supporting-and-retaining element 31 along its periphery, where m is the number of containers B in a container group BG. Each supporting-and-retaining element 31 suspends a bottle B. The empty section 8 is devoid of supporting-and-retaining elements 31.

In the illustrated embodiment, the number of supporting-and-retaining elements 21, n, in the main feeding-unit 20 is a whole number multiple of the number, m, of supporting-and-retaining elements 31 in the receiving section 7 of the first distribution-star 30. This means that the number m of supporting-and-retaining elements 31 represents a whole-number divisor of the plurality n of supporting-and-retaining elements 21 of the main feeding-unit 20. As a result, the ratio n/m is a whole number greater than one.

In one example, which is shown in FIG. 3, the main feeding-unit 20 has thirty supporting-and-retaining elements 21 and the first star 30 has fifteen supporting-and-retaining elements 31. The ratio n/m is therefore two.

In such an example, supporting-and-retaining elements 31 occupy half of the first distribution-star's periphery. In some embodiments, supporting-and-retaining elements 31 occupy two opposing quarters of the circumference. The remaining quarters are unoccupied.

In operation, the main feeding-unit 20 and the first and second distribution-stars 30, 40 run continuously at a pre-determined and preferably constant rotation speed. The geometry is such that angles between supporting-and-retaining elements 21 and angles between the supporting-and-retaining elements 31, which are arranged grouped in a receiving section 7, are matched to one another so that the containers B in the transfer region 5 can be transferred individually from one supporting-and-retaining element 21 to another supporting-and-retaining element 31.

As the receiving section 7 of the first distribution-star 30 passes through the first transfer region 5, the supporting-and-retaining elements 31 of the first distribution-star 30 receive containers B that have been brought there by the main feeding-unit 20.

When the empty section 8 of the first distribution-star 30 passes through the first transfer region 5, no further transfer occurs. After all, there are no supporting-and-retaining elements 31 available. This means that the containers remain at the supporting-and-retaining elements 21 of the main feeding-unit 20. Accordingly, the main feeding-unit 20 transports them to a second transfer region 6. This second transfer region 6 is between the main feeding-unit 20 and the second distribution-star 40. The second distribution-star 40 has no empty section. Therefore, the second distribution-star 40 is able to pick up all containers B brought to it. These represent the leftovers that were bypassed by the first distribution-star 30.

In the illustrated example, a fully occupied main feeding-unit 20 distributes its load into two container groups, effectively turning a continuous flow into a discontinuous flow.

A first container group BG with fifteen containers B is drawn from the container flow by the first distribution-star 30. The containers B of the first container group BG are containers B that were transported directly following one another in the container flow.

The remaining fifteen containers B are transported onwards by the second distribution-star 40 to form a second container group BG at the distribution star 40.

As a result, due to the rotation of the first and second distribution-stars 30, 40 and of the main feeding-unit 30, the first distribution-star 30 is in a rotation state in which, again, the receiving section 5 of the first distributor 30 is in the first transfer region 5. The cycle begins again anew with the taking of a third container group BG. The net effect is that of converting the continuous container-flow into a discontinuous container-flow that has been divided into individual container strands.

As shown in FIG. 1, all the containers B are transferred from the distribution-stars 30, 40 to the linear feeding-unit 4. The first distribution-star 30 transfers the outcoming container groups BG onto a first linear-section 4.1. The second distribution-star transfers the outcoming container groups BG onto a second linear-section 4.2 that is parallel to the first linear-section 4.1.

The containers B transferred in this way to the linear feeding-unit 4 are transported in a linear feeding direction LZR towards the transfer device 3, which will take them up as a group BG and transfer them into the clocked processing-machine 10.

The transfer device 3 also works in a clocked or pulses manner. It operates to take up container groups BG from both either the first or second linear-section 4.1, 4.2. Preferably, the transfer device 3 alternates between the first and second linear-sections 4.1, 4.2. In either case, the transfer device 3 transfers the container group BG in a transfer direction TR that is transverse to the linear feeding direction LZR, in a clocked or pulsed manner to the clocked processing-machine 10.

The apparatus 1 thus divides a continuously-fed container flow, initially moving in the entry direction ER, into two container strands that both move in the linear feeding direction LZR and that are both discontinuous container strands. This provides enough time for the container group BG to stand still so that it can be transferred as a block in a pulsed or clocked manner for feeding into the clocked processing-machine 10.

A dividing unit along the linear-sections 4.1, 4.2 sets the distance between containers to form a container group BG that is optimal for handling by the transfer device 3. In the illustrated embodiment, the dividing unit takes the form of a dividing worm.

As the transfer device 3 transfers the container group BG into the clocked processing-machine 10, the transport of containers B through the entry device 2 continues unabated. As a result, the linear feeding-unit 4 finds itself constantly being loaded with containers B for forming new container groups BG.

Figure 4:
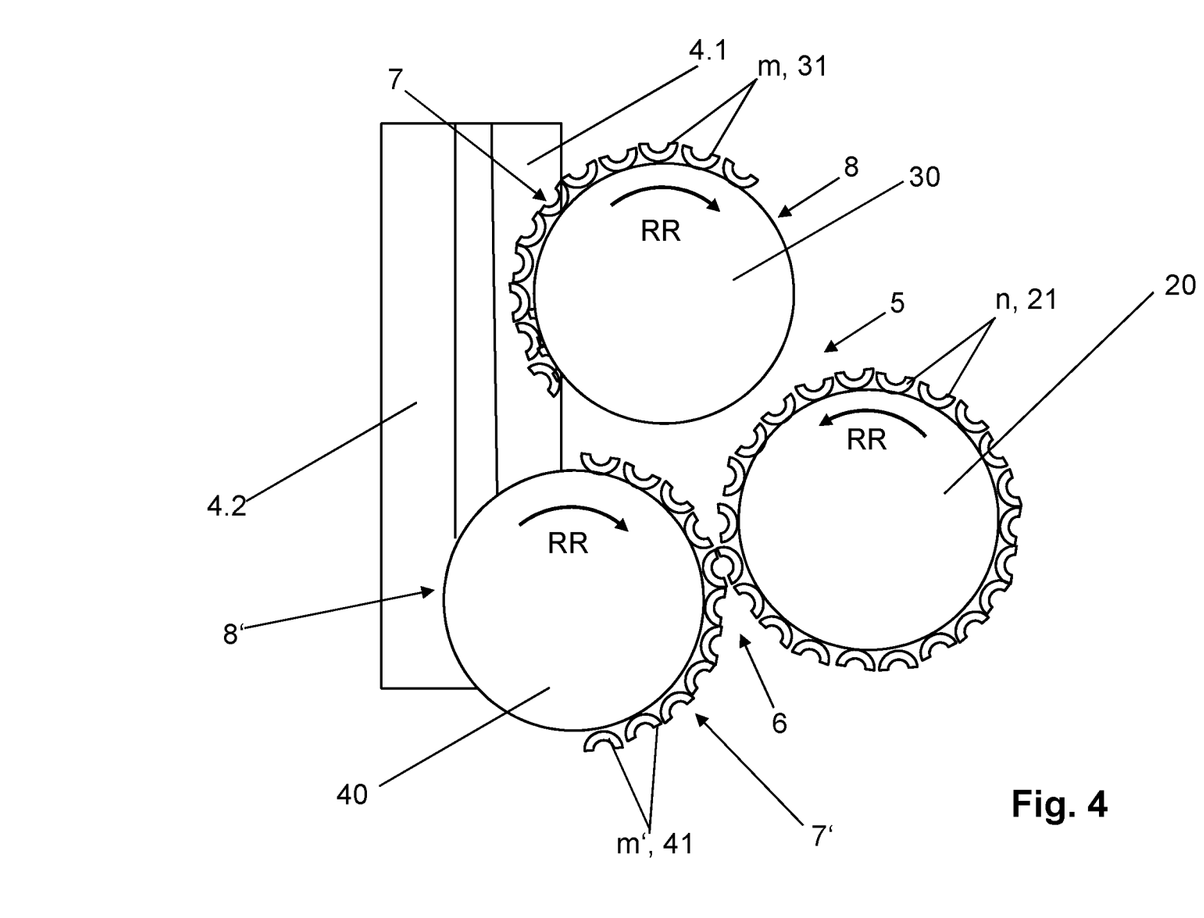
FIG. 4 shows a view from above of an exemplary embodiment of an entry device.

FIG. 4 shows an embodiment in which the second distribution-star is configured in much the same way as the first distribution-star in the preceding embodiment. In this embodiment, the second distribution-store likewise has a receiving section 7' and an empty section 8'. The receiving section 7' has a number m' of supporting-and-receiving elements 41. The number m' is the number of containers that are to be in each container group BG. In the illustrated embodiment, n is equal to twenty-two and both m and m' are equal to eleven thus ensuring that the ratios between n and m and n and m' are both equal to two. It is, however, possible for other an embodiment to have a different ratio, such as three, four, or five.

In other embodiments, there may be more than one receiving section 7 and more than one empty section 8. For example, one or both distribution stars 30, 40 may be divided into quarters spanning ninety degrees each with opposing quarters defining receiving sections and another pair of opposing quarters defining empty sections. Or one can have a distribution star in which the receiving section forms a third of the distribution star's circumference while the empty section forms the remaining two thirds.

In some embodiments, the supporting-and-retaining elements 21, 31, 41 at the main feeding-unit 20 and at the distribution-stars 30, 40 are secured to a star plate in such a way that in each case they project over the star plate's periphery. As such, they protrude outwards over or project from the star plate's periphery.

As suggested by FIG. 4, at the second transfer-region 6, the second distribution-star 40 receives all the containers B that were bypassed by the first distribution-star 30 at the first transfer-region 5.

The apparatus 1 thus enables simple grouping and removal of containers B from a container flow as a result of rotational movement of the various components of the entry device 2. There is no need to control the supporting-and-retaining elements 31, 41, of the distribution-stars 30, 40. There is no need to adjust the supporting-and-retaining elements 31, 41 either in the radial direction or in a direction along the periphery. According to the invention, the supporting-and-retaining elements 31, 41 remain in a fixed setting or fixed position relative to the star plate.

As is apparent from the figures, it is possible for the linear feeding-unit 4 to have more than two linear-sections. All that would be needed is the addition of more distribution stars configured in the manner already disclosed.

It is likewise possible to have a linear feeding-unit 4 with only a single linear-section 4.1, in which case the second distribution-star 40 conveys all containers bypassed by the first distribution-star 30 to a buffer.

In yet another embodiment, the main feeding-unit 2 is formed by an entry oval that comprises at least two linear transport sections that are oriented parallel to one another and two deflection sections that are opposite each other and that connect the two linear transport-sections to each other.

Embodiments of such an entry oval include a gripper chain or a transport rail with at least one carriage element or a drawing module. These would be equipped with supporting-and-retaining elements 21.

In a preferred embodiment, the carriage element or drawing module comprises a drive unit, such as a servomotor unit or of an electromagnetic direct drive. This would allow the carriage element or the drawing module to be moved in a controlled manner along a transport rail to form a train of carriage elements that corresponds to the size of the desired container group BG. Such an embodiment would permit the carriage element or drawing module to be accelerated and decelerated on command or stopped at a predetermined point and then set in motion again.

The invention has been described heretofore by way of exemplary embodiments. It is understood that numerous modifications and derivations are possible, without thereby departing from the inventive concepts on which the invention is based.

The invention claimed is:

1. An apparatus comprising a linear feeding-unit and an entry device, wherein said linear feeding-unit comprises a first linear section and a transfer device that transfers containers, as a group, from said linear feeding-unit to a clocked processing-machine, wherein said entry device comprises a main feeding-unit, a first distribution-star, and a second distribution-star, wherein said main feeding-unit comprises a first number of supporting-and-retaining elements, from each of which hangs a container, wherein said first distribution-star receives containers from said main feeding-unit at a first transfer-region and transfers said containers to said first linear section, wherein said second distribution-star receives containers from said main feeding-unit at a second transfer-region, wherein a periphery of said first distribution-star comprises a receiving section that receives containers from said main feeding-unit and an empty section interrupts receiving of said containers, wherein said empty section is devoid of supporting-and-retaining elements and said receiving section comprises a second number of supporting-and-retaining elements, said second number being a pre-determined number of containers in said container group, and wherein said containers move along said entry device in a transport direction, wherein said second transfer-region is downstream of said first transfer-region, and wherein said second distribution-star receives all containers that have been bypassed by said first distribution-star and further transports said bypassed containers.

2. The apparatus of claim 1, wherein said first number is an integer multiple of said second number.

3. The apparatus of claim 1, wherein said linear feeding-unit comprises a second linear-section that lies parallel to said first linear-section, and wherein said second distribution-star transfers containers received from said main feeding-unit to said second linear-section.

4. The apparatus of claim 1, wherein said second distribution-star comprises a pocket star.

5. The apparatus of claim 1, wherein said second distribution-star comprises a toothed star.

6. The apparatus of claim 1, wherein said second distribution-star comprises, along a periphery thereof, a receiving section and an empty section that adjoins said receiving section, wherein said receiving section is occupied by a third number of supporting-and-retaining elements and said empty section is devoid of supporting-and-retaining elements, said third number being equal to said pre-determined number of containers in said container group.

7. The apparatus of claim 1, wherein said main feeding-unit comprises an entry star.

8. The apparatus of claim 1, wherein said main feeding-unit comprises an endlessly circulating transport section.

9. The apparatus of claim 1, wherein said main feeding-unit comprises an entry oval, two parallel linear transport sections, and two deflection sections that are arranged opposite one another and that connect said linear transport sections.

10. The apparatus of claim 1, wherein said main feeding-unit comprises an endlessly circulating gripper chain.

11. The apparatus of claim 1, wherein said main feeding-unit comprises a transport rail with associated carriage elements.

12. The apparatus of claim 1, wherein said linear feeding-unit comprises a second linear-section, said apparatus further comprising dividing units disposed in a region of said first and second linear-sections, and wherein said dividing units are arranged before or inside a transition region between said linear feeding-unit and said transfer device.

13. The apparatus of claim 1, wherein said dividing units are formed by dividing worm elements or by pocket chains.

14. The apparatus of claim 1, wherein a distribution star selected from the group consisting of said first and second distribution-stars comprises plural receiving sections, each of which comprises as many supporting-and-retaining elements as there are containers in said container group and wherein a linear section is arranged between each pair of said receiving sections.

15. The apparatus of claim 1, wherein said transfer device is a clocked or pulsed transfer device that is configured to transfer a container group from said linear feeding unit into said clocked processing machine.

16. A method comprising using a main feeding-unit to transport hanging containers in a continuous container-flow, at a first transfer-region, using a first distribution-star to remove a pre-determined number of containers from said main feeding-unit and to provide said containers to a first linear-section of a linear feeding-unit, at a second transfer-region, using a second distribution-star to remove, from said main feeding-unit, containers that were bypassed by said first distribution-star as a result of said first distribution-star having interrupted removal of said containers from said main feeding-unit, and causing a transport device to take up said containers that were removed by said first distribution star as a container group from said first linear-section and to hand over said container group to a clocked-processing machine, wherein using a first distribution-star to remove said pre-determined number of containers comprises causing a receiving section of said first distribution-star to pass through said first transfer-region, said receiving section extending along a periphery of said first distribution-star and having a first number of supporting-and-retaining elements, each of which receives a hanging container from said main feeding-unit, said first number being equal to said pre-determined number, whereby, as a result of having passed through said first transfer-region, said receiving section receives said pre-determined number of containers and wherein using said first distribution-star to interrupt removal of containers from said main feeding-unit comprises causing an empty section of said first distribution star to pass through said first transfer-region, said empty section extending along said periphery of said first distribution-star following said receiving section and being devoid of supporting-and-retaining elements.

17. The method of claim 16, wherein rotation of said first distribution-star causes said receiving section and said empty section to take turns passing through said first transfer-region.

18. The method of claim 16, further comprising causing said second distribution-star to provide said containers received from said main feed-unit to a second linear-section of said linear feeding-unit.

19. The method of claim 18, further comprising causing said transfer device to alternate between taking up a container group from said first linear section and taking up a container group from a second linear section of said linear feeding-unit.

\* \* \* \* \*